United States Patent
Adams et al.

(10) Patent No.: US 12,253,086 B2
(45) Date of Patent: Mar. 18, 2025

(54) ELECTRIC SUBMERSIBLE PUMP

(71) Applicant: ARAMCO SERVICES COMPANY, Houston, TX (US)

(72) Inventors: Robert Adams, Houston, TX (US); Max Deffenbaugh, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 269 days.

(21) Appl. No.: 17/809,466

(22) Filed: Jun. 28, 2022

(65) Prior Publication Data

US 2023/0417248 A1 Dec. 28, 2023

(51) Int. Cl.
| | |
|---|---|
| *F04D 13/08* | (2006.01) |
| *H02K 1/14* | (2006.01) |
| *H02K 19/10* | (2006.01) |
| *F04D 13/10* | (2006.01) |

(52) U.S. Cl.
CPC .......... *F04D 13/086* (2013.01); *H02K 1/14* (2013.01); *H02K 19/10* (2013.01); *F04D 13/10* (2013.01)

(58) Field of Classification Search
CPC .... F04D 13/086; F04D 13/10; F04D 13/0633; H02K 1/14; H02K 19/10; H02K 5/225; H02K 5/132; H02K 11/33
See application file for complete search history.

(56) References Cited

U.S. PATENT DOCUMENTS

| | | | |
|---|---|---|---|
| 3,529,223 A * | 9/1970 | Vergez, Jr. .............. | H02P 23/08 318/805 |
| 6,045,333 A | 4/2000 | Breit | |
| 7,285,931 B2 | 10/2007 | Ahmed | |
| 8,672,641 B2 | 3/2014 | Yuratich | |
| 9,482,078 B2 | 11/2016 | Carstensen et al. | |
| 10,454,323 B2 | 10/2019 | Shah et al. | |
| 10,876,393 B2 * | 12/2020 | Rendusara .......... | F04D 15/0088 |
| 2005/0269889 A1 | 12/2005 | Tessier et al. | |
| 2013/0264979 A1 * | 10/2013 | Marchitto ................ | H02P 6/08 318/400.27 |
| 2013/0341033 A1 * | 12/2013 | Carstensen ............ | H02K 16/00 166/372 |

(Continued)

FOREIGN PATENT DOCUMENTS

WO 2020198446 A1 10/2020

OTHER PUBLICATIONS

R. Kumar et al.; "Design of Outer Rotor Permanent Magnet Flux Switching Machine for Downhole Application", International Journal of Applied Engineering Research; vol. 12; No. 7; 2017; pp. 1383-1388 (6 pages).

(Continued)

*Primary Examiner* — Charles G Freay
*Assistant Examiner* — Lilya Pekarskaya
(74) *Attorney, Agent, or Firm* — Osha Bergman Watanabe & Burton LLP

(57) ABSTRACT

An electric submersible pump (ESP) including: a switched reluctance motor (SRM) including stator coils. The number of the stator coils is a multiple of three, surface electronics that drive the SRM, a cable that connects the SRM to the surface electronics. The cable includes conductors in a number equal to the number of the stator coils, each cable includes a push-pull driver that connects the cable to a ground, a DC voltage different from the ground, or disconnects the cable.

11 Claims, 5 Drawing Sheets

(56) References Cited

U.S. PATENT DOCUMENTS

| | | | |
|---|---|---|---|
| 2015/0275870 A1 | 10/2015 | Van Dam et al. | |
| 2016/0285402 A1* | 9/2016 | Barrass | H02P 25/08 |
| 2017/0126077 A1* | 5/2017 | Torrey | H02K 1/16 |
| 2018/0347305 A1* | 12/2018 | Angers, Jr. | E21B 33/072 |
| 2021/0257949 A1* | 8/2021 | McDonald | H02K 19/16 |
| 2021/0372244 A1* | 12/2021 | Riachentsev | F04D 13/0673 |

OTHER PUBLICATIONS

T. R. Brinner et al.; "Induction Versus Permanent-Magnet Motors for Electric Submersible Pump Field and Laboratory Comparisons", IEEE Transactions on Industry Applications; vol. 50; No. 1; Jan. 2014; pp. 174-181 (8 pages).

\* cited by examiner

ELECTRIC SUBMERSIBLE PUMP

BACKGROUND

An electric submersible pump (ESP) has a hermetically sealed motor that is submersible in a fluid to be pumped to a surface.

Oil and gas production or water production from subsurface wells is often increased by deploying an ESP deep within a subsurface well. An ESP comprises a downhole pump and a downhole electric motor which turns the pump to propel the fluids to the surface. In ESP applications, the motors are all powered, controlled, or driven over a cable that runs from control electronics at the surface of the earth to the motor, which is typically near the bottom of the well, as much as a mile or more away from the surface.

Electric motors for powering ESPs include an electric motor working as a downhole pump, an electronic drive, which is at the surface, a long cable which connects the electronic drive to the electric motor, high pressure electrical pass-throughs, that provide electrical connections from the exterior of the well head to the high pressure interior of the well, and electrical pass-throughs at any packers in the well that centralize the production tubing and isolate the annulus from the produced fluids.

Most electric motors for powering ESPs are based on induction motors. The torque of induction motors is relatively low when the rotor is stalled. This is particularly disadvantageous for ESP applications, in that there is limited torque for breaking free, if the pump becomes jammed by sediments or heavy hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an electric submersible pump (ESP) comprising: a switched reluctance motor (SRM) comprising stator coils, wherein the number of the stator coils is a multiple of three, surface electronics that drive the SRM, a cable that connects the SRM to the surface electronics, wherein the cable comprises conductors in a number equal to the number of the stator coils, each cable comprises a push-pull driver that connects the cable to a ground, a DC voltage different from the ground, or disconnects the cable.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The following figures are included to illustrate certain aspects of the embodiments and should not be viewed as exclusive embodiments. The subject matter disclosed is amenable to considerable modifications, alterations, combinations, and equivalents in form and function, as will occur to those skilled in the art and having the benefit of this disclosure.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed herein relate to an electric submersible pump (ESP) comprising: a switched reluctance motor (SRM) comprising stator coils, wherein the number of the stator coils is a multiple of three, surface electronics that drive the SRM, a cable that connects the SRM to the surface electronics, wherein the cable comprises three conductors, and each conductor terminates to a push-pull driver that either connects the cable to: a ground, a DC voltage different from the ground, or disconnects the cable.

Embodiments of the present disclosure may provide at least one of the following advantages.

The SRM has no permanent magnets. Thu, the SRM is free of counter-EMF speed limitation of an induction motor, making the SRM capable of operating at very high speeds. The SRM is also able to apply full torque when the rotor is stalled, enabling the SRM to break free from jams that could stop induction motors.

Figure 1:
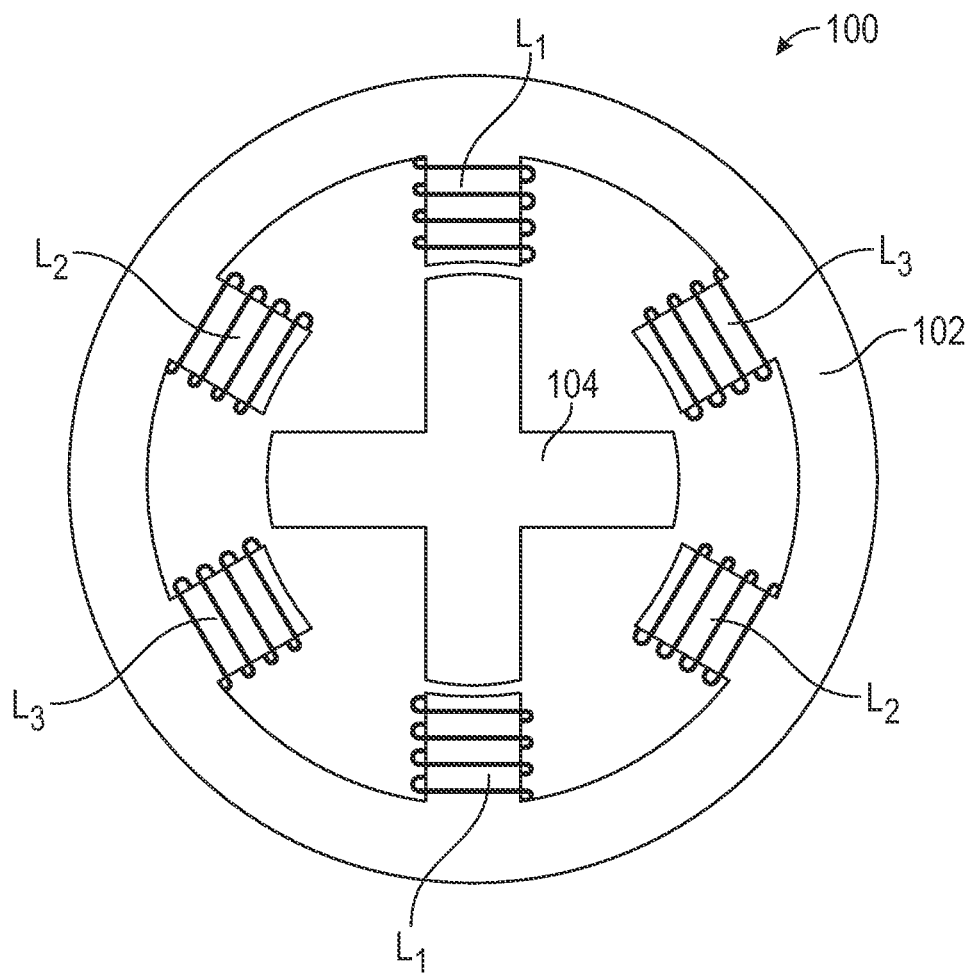
FIG. 1 shows a cross-section of a SRM, according to one or more embodiments.

FIG. 1 shows a cross-section of a SRM 100. The SRM 100 comprises a stator 102 and a rotor 104. The rotor 104 is made entirely of a permeable material (e.g., steel) and does not contain windings or permanent magnets. The stator 102 is fixed and the rotor 104 is rotatably disposed inside the stator 102.

In one or more embodiments, the SRM 100 includes a certain number of stator coils, wherein the certain number is a multiple of three, such as 6, 9, 12, etc. In one or more embodiments, every third coil around the circumference of stator 102 is connected in parallel or in series so that there are three independently energized sets of stator coils. For purposes of this disclosure, the SRM described as having three stator coils will be understood to include an SRM which has three independently energized sets of stator coils, where the stator coils in each set are connected in series or parallel or a combination of series and parallel.

According to the above description, the stator 102 comprises three stator coils $L_1$, $L_2$, and $L_3$. A current applied to the stator coils $L_1$, $L_2$, and $L_3$ generates a torque to the rotor 104. In the SRM 100, torque is generated by progressively energizing poles of the stator coils $L_1$, $L_2$, and $L_3$ to advance the rotor 104. The magnetic flux linkage between the rotor 104 and the stator 102 acts to repeatedly align the poles of the rotor 104 and the stator 102.

Motor controllers for the SRM 100 use current-switching circuits (push-pull driver) to drive the SRM 100, wherein a current pulse is applied to each stator coil $L_1$, $L_2$, and $L_3$ at the appropriate time to advance the rotor 104. The speed of the SRM is synchronously controlled by the frequency of the current pulses. The current pulses must be applied independently to each of the three stator coils $L_1$, $L_2$, and $L_3$ (or set of stator coils), therefore the stator coils $L_1$, $L_2$, and $L_3$ are connected independently and are capable of receiving six control signals. In one or more embodiments, stator coils $L_1$, $L_2$, and $L_3$ are connected in a Wye circuit and are capable of receiving four control signals.

Figure 2:
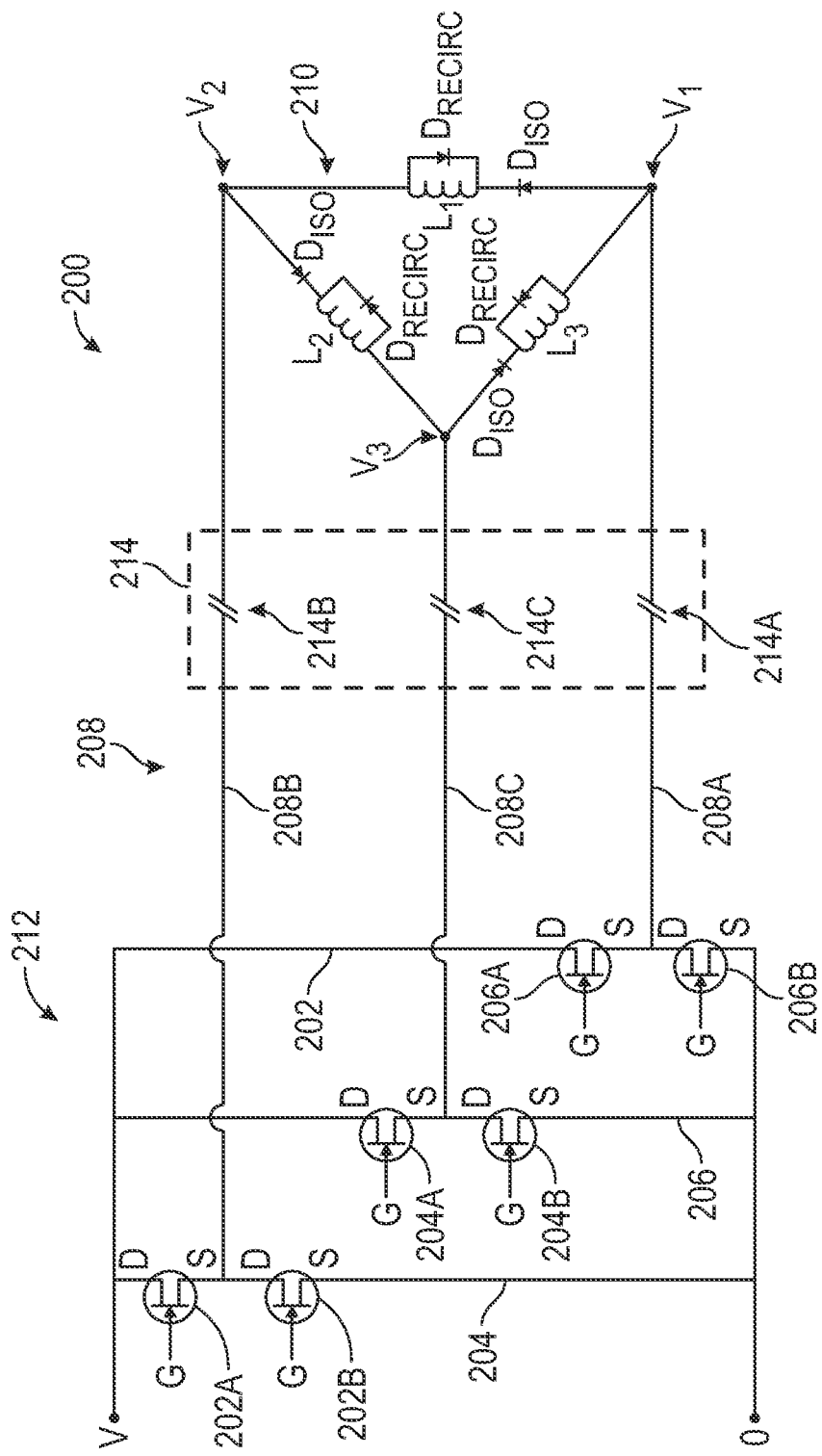
FIG. 2 shows an electric circuit of an SRM for turning an ESP, according to one or more embodiments.

FIG. 2 shows an electric circuit 200 of an SRM for turning an ESP, according to one or more embodiments.

The electric circuit 200 comprises surface electronics 212 comprising the motor controllers, wherein the surface electronics 212 comprise a positive terminal V, a ground and three voltage dividers 202, 204, 206 which are connected in parallel to the positive terminal V and the ground 0. A first voltage divider 202 comprises a first and a second field effect transistor (FET) 202A, 202B. A second voltage divider 204 comprises a first and a second FET 204A, 204B. A third voltage divider 206 comprises a first and a second FET 206A, 206B. Each of the FETs has a Gate G, Drain D, and source S. In each of the voltage dividers 202, 204, and 206, the drain D of the first FET 202A, 204A, and 206A is connected to the positive terminal V, the source of the second FET 202B, 204B, and 206B is connected to the ground 0, and the source S of the first FET 202A, 204A, and 206A is connected to the drain D of the second FET 202B, 204B, and 206B.

The electric circuit 200 further comprises the three stator coils $L_1$, $L_2$, and $L_3$ of the SRM (see FIG. 1). The three stator coils $L_1$, $L_2$, and $L_3$ are connected in a delta circuit 210 with three vertices $V_1$, $V_2$, and $V_3$. An isolation diode $D_{ISO}$ is connected to each coil $L_1$, $L_2$, and $L_3$ in series. The direction of the isolation diodes $D_{ISO}$ is such as to allow a current to flow around the delta circuit 210 in the same direction as the rotation of a rotor 104 of the SRM (see FIG. 1). Thus, the forward biased direction of the isolation diodes $D_{ISO}$ of the delta circuit 210 in FIG. 2 is clockwise if the SRM is intended to rotate in the clockwise direction and is counter-clockwise if the SRM is intended to rotate in the counter-clockwise direction.

A three-conductor cable 208 connects the delta circuit 210 to the surface electronics 212. A first cable 208A of the three-conductor cable 208 connects a first vertex $V_1$ to the wire connecting the source S of the first FET 202A to the drain D of the second FET 202B of the first voltage divider 202. A second cable 208B of the three-conductor cable 208 connects a second vertex $V_2$ to the wire connecting the source S of the first FET 204A to the drain D of the second FET 204B of the second voltage divider 204. A third cable 208B of the three-conductor cable 208 connects a third vertex $V_3$ to the wire connecting the source S of the first FET 204A to the drain D of the second FET 204B of the third voltage divider 206.

Furthermore, the surface electronics 212 include a drive/control unit 214 with three push-pull driver 214A, 214B, and 214C for each cable 208A, 208B, and 208C, wherein each push-pull driver 214A, 214B, and 214C connects one of the cables 208A, 208B, and 208C to the ground 0, or a DC voltage different from the ground 0, or disconnect the one of the cables 208A, 208B, and 208C. The push-pull driver disconnects, energizes, or provides a return path to each of the cables 208A, 208B, and 208C as needed to operate the SRM downhole. With this arrangement, a SRM with three stator coils is operated with the existing three-conductor cable for the ESP, allowing for low cost and easy replacement of induction or permanent magnet motors of the SRM for downhole ESP applications.

In one or more embodiments, the SRM comprises recirculation diodes $D_{RECIRC}$, wherein a recirculation diode $D_{RECIRC}$ is connected to each of the stator coils $L_1$, $L_2$, and $L_3$ in a parallel connection. The recirculation diodes $D_{RECIRC}$ are installed in the opposite direction compared to the direction of the isolation diodes $D_{ISO}$. In other words, the forward biased direction of the recirculation diodes $D_{RECIRC}$ is opposite to the forward biased direction of the isolation diodes $D_{ISO}$.

When a voltage difference is applied across two vertices (e.g., $V_1$ and $V_2$) of the delta circuit 210 biased in a forward direction of the isolation diode $D_{ISO}$ between the two vertices ($V_1$ and $V_2$), a current will begin flowing through the coil ($L_1$) and will grow over time as long as the voltage difference is maintained. When the voltage difference is no longer applied, for example by connecting both vertices ($V_1$ and $V_2$) to the same voltage, such as to ground, a counter-EMF (counter-electromotive force, that opposes the change in current which induced it) is induced in the stator coil ($L_1$) which will keep the current flowing through the stator coil ($L_1$).

In the case where the isolation diodes $D_{ISO}$ are not present, the current flowing through the stator coil ($L_1$) flows through the cable (208B) to the surface electronics 212. The current will decay as energy which is imparted to the rotor 104 and is dissipated in the resistance of the surface electronics 212 and the resistance of the stator coil ($L_1$).

In the case where the isolation diodes $D_{ISO}$ are present, the current flowing through the stator coil ($L_1$) flows through the isolation diodes $D_{ISO}$ rather than through the cable (208B) to the surface electronics 212. Since the energy dissipation in the isolation diodes $D_{ISO}$ is less than the energy dissipation in the long cable (208B) to the surface electronics 212, the isolation diodes $D_{ISO}$ improve the energy efficiency of the SRM.

Figure 3:
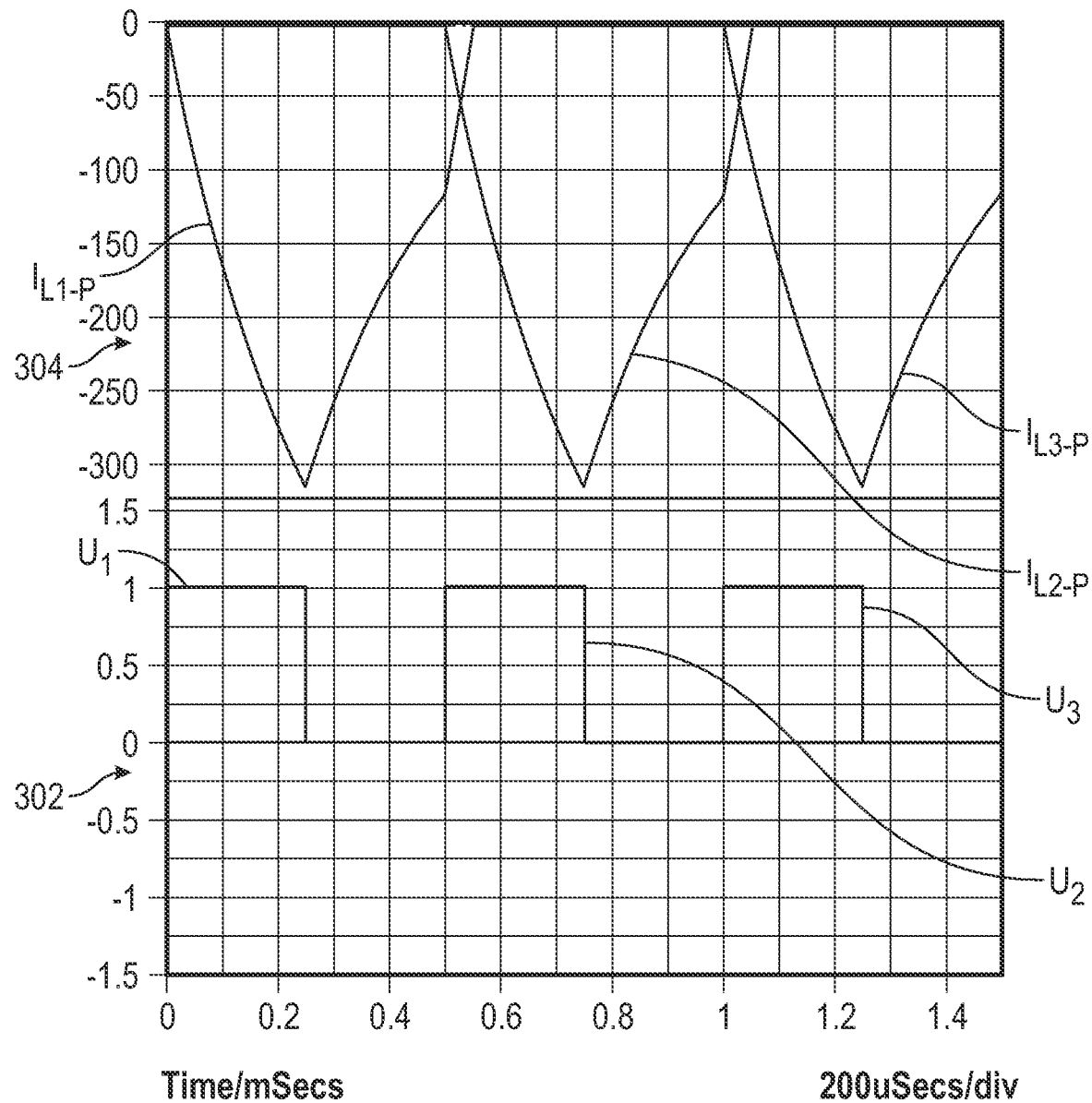
FIG. 3 shows the voltage waveforms of the voltages applied to the vertices of the SRM and the resulting current waveforms of the currents flowing through the stator coils, in case the recirculation diodes are not present, according to one or more embodiments.

FIG. 3 shows the voltage waveforms 302 of the voltages $U_1$, $U_2$, and $U_3$ applied to the vertices $V_1$, $V_2$, and $V_3$ of the SRM and the resulting current waveforms 304 of the currents $I_{L1}$, $I_{L2}$, and $I_{L3}$ flowing through the stator coils $L_1$, $L_2$, and $L_3$, in case the recirculation diodes $D_{RECIRC}$ are not present.

While a voltage is applied to a vertex in the delta circuit 210, the current through the stator coil with the forward biased diode grows. For example, when a first voltage $U_1$ is applied to the first vertex $V_1$, the first current $I_{L1}$ through the first stator coil $L_1$ grows. Once the first vertex $V_1$ is grounded, the first current $I_{L1}$ through the stator first stator coil $L_1$ continues to circulate through the second cable 208B to the surface electronics 212, back down the first cable 208A to the first stator coil $L_1$. The first current $I_{L1}$ continues to generate a force on the rotor 104 while it is circulating in the first stator coil $L_1$. When the second voltage $U_2$ is applied to the second vertex $V_2$, the isolation diode $D_{ISO}$ in series with the first stator coil $L_1$ becomes reverse-biased, and a counter EMF is generated at the first stator coil $L_1$, which dumps the remaining energy in the first stator coil $L_1$ into the second stator coil $L_2$.

As shown in FIG. 3, there is a sharp change in the current $I_{L1}$, when the voltage $U_2$ is applied to the coil $L_2$ in case the recirculation diodes $D_{RECIRC}$ are not present. Accordingly, there is a sharp change in the current $I_{L2}$, when the voltage $U_3$ is applied to the coil $L_3$.

Figure 4:
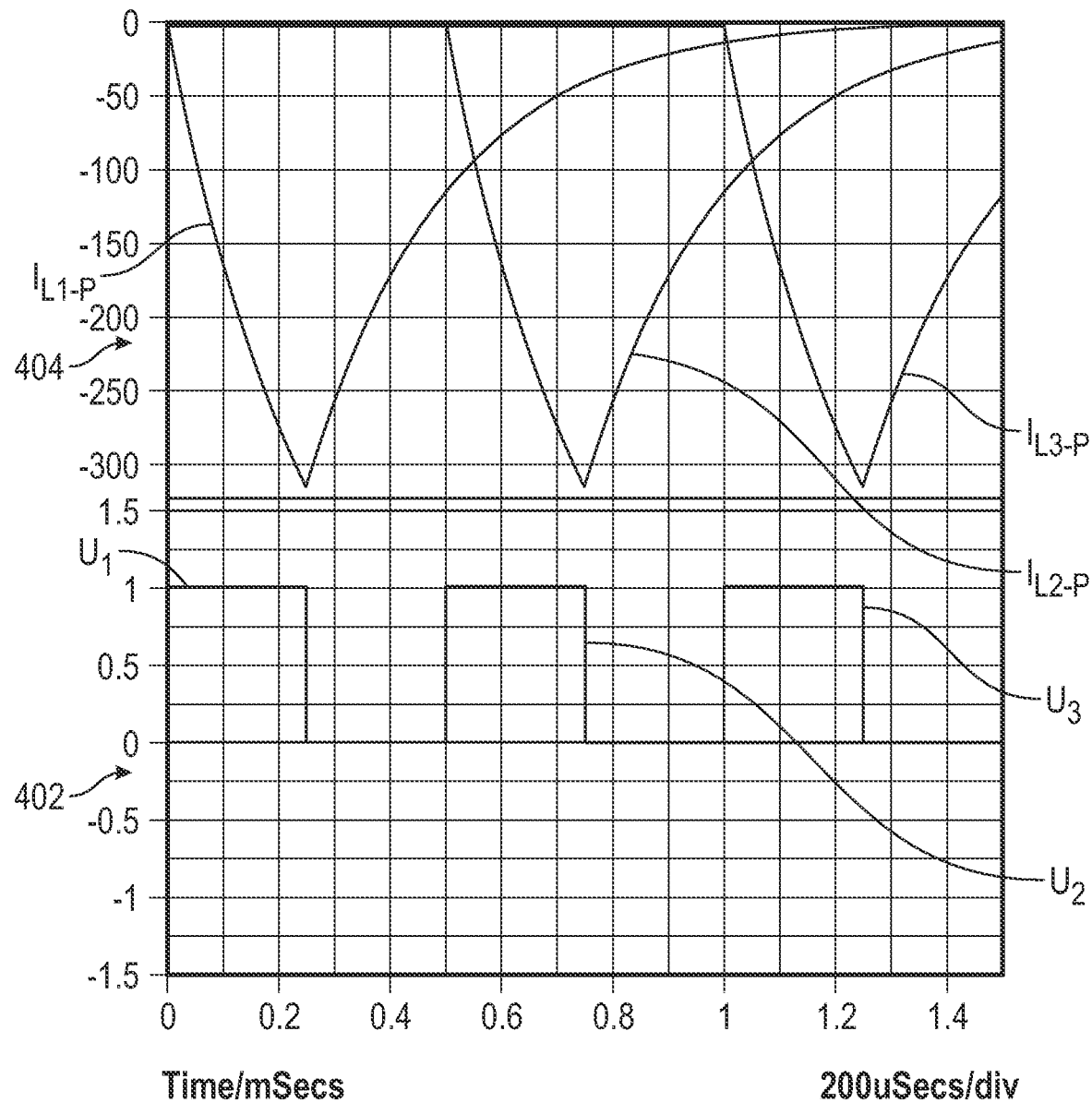
FIG. 4 shows the voltage waveforms of the voltages applied to the vertices of the SRM and the resulting current waveforms of the currents flowing through the stator coils, in case the recirculation diodes are present, according to one or more embodiments.

FIG. 4 shows the voltage waveforms 402 of the voltages $U_1$, $U_2$, and $U_3$ applied to the vertices $V_1$, $V_2$, and $V_3$ of the SRM and the resulting current waveforms 404 of the currents $I_{L1}$, $I_{L2}$, and $I_{L3}$ flowing through the stator coils $L_1$, $L_2$, and $L_3$, in case the recirculation diodes $D_{RECIRC}$ are present.

The recirculation diodes $D_{RECIRC}$ allow a current (e.g., $I_{L1}$) to continue flowing through a first stator coil ($L_1$) and back through the recirculation diode $D_{RECIRC}$ after the first voltages ($U_1$) across the first stator coil ($L_1$) is removed. The advantage of this configuration is that the first current ($I_{L1}$) recirculates over a low resistance path through the recirculation diodes $D_{RECIRC}$ instead of over a high resistance path of the three-conductor cable 208 back up to the surface electronics 212 and then back down through the three-conductor cable 208. This is beneficial during the time before the second voltage ($U_2$) of the second stator coil ($L_2$) is activated and a disadvantage after that time as the remaining current produces a force from the second stator coil ($L_2$) which is from that time forward opposite to the direction of motion.

Figure 5:
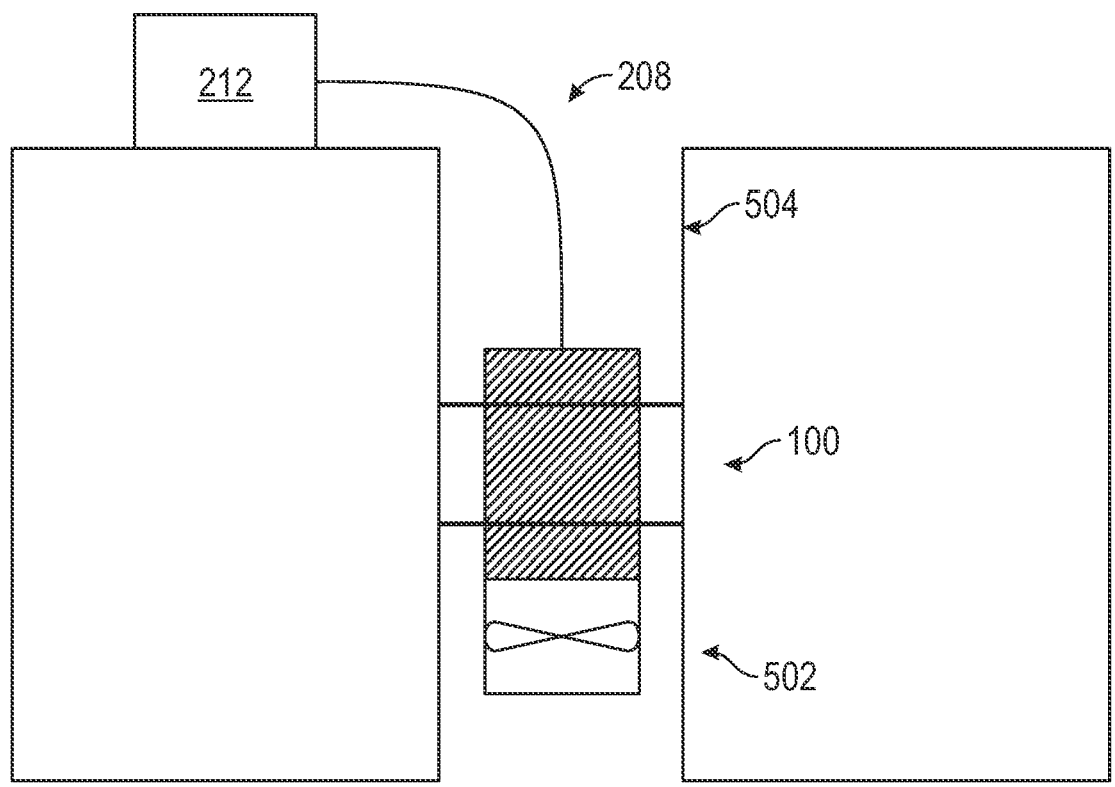
FIG. 5 shows a three-conductor pass-through, according to one or more embodiments.

As shown in FIG. 4, the current $I_{L1}$ in coil $L_1$ continues to gradually decay even when a neighboring coil $L_2$ is energized in case the recirculation diodes $D_{RECIRC}$ are present. Accordingly, the current $I_{L2}$ in coil $L_2$ continues to gradually decay even when a neighboring coil $L_3$ is energized Whether the recirculation diodes $D_{RECIRC}$ are advantageous for a specific application depends on the balance between the energy lost due to circulating current through the long cables (without recirculation diodes $D_{RECIRC}$) and the energy left in the stator coil when the next stator coil activates (with recirculation diodes $D_{RECIRC}$) Then, the choice of whether to use the recirculation diodes $D_{RECIRC}$ depends on the resistances of the cables and the stator coils, the inductance of the stator coils, and the voltage drop across the forward biased recirculation diodes $D_{RECIRC}$, as well as the load torque on the SRM and the desired speed of rotation. Numerical simulations used on these values determine whether the SRM is more efficient with or without the recirculation diodes $D_{RECIRC}$ FIG. 5 shows cable 208 designed as a three-conductor pass-through connecting a SRM 100 to surface electronics 212. The SRM 100 drives an ESP 502 down a well 504. The surface electronics 212 are disposed on a surface of the well 504.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. An electric submersible pump (ESP) comprising:
   a switched reluctance motor (SRM) comprising stator coils, wherein a number of the stator coils is a multiple of three,
   surface electronics that drive the SRM,
   a plurality of cables that connects the SRM to the surface electronics,
      wherein each cable in the plurality of cables includes conductors in a number equal to the number of the stator coils,
      wherein each cable in the plurality of cables includes a push-pull driver,
      wherein the push-pull driver for each one cable in the plurality of cables that connects the one cable in the plurality of cables to a ground, connects a DC voltage different from the ground, or disconnects the one cable in the plurality of cables,
      wherein an isolation diode is connected in series to each stator coil, and
      wherein a direction of the isolation diode is such as to allow an electric current flow around a delta circuit in a same direction as a rotation of a rotor of the SRM.

2. The ESP according to claim 1, wherein the number of the stator coils is three.

3. The ESP according to claim 2, wherein the three stator coils are connected in a delta circuit.

4. The ESP according to claim 2, wherein the three stator coils are connected in a Wye circuit.

5. The ESP according to claim 1, wherein the SRM comprises an annular stator, the stator coils are disposed around a circumference of the annular stator, and every third stator coil around the circumference of the annular stator is connected in parallel, such that there are three sets of stator coils able to be independently energized.

6. The ESP according to claim 1, wherein the SRM comprises an annular stator, the stator coils are disposed around a circumference of the annular stator, and every third stator coil around the circumference of the annular stator is connected in series, such that there are three sets of stator coils able to be independently energized.

7. The ESP according to claim 1, wherein the SRM comprises an annular stator, the stator coils are disposed around a circumference of the annular stator, and every third stator coil around the circumference of the annular stator is connected in a combination of series and parallel connections, such that there are three sets of stator coils able to be independently energized.

8. The ESP according to claim 1, wherein a recirculation diode is connected parallel to each stator coil.

9. The ESP according to claim 1, further comprising a three-conductor pass-through, wherein cables of a conductor cable are passed through the three-conductor pass-through.

10. The ESP according to claim 1, wherein a recirculation diode is connected parallel to each stator coil, and wherein the recirculation diodes are disposed in an opposite direction with respect to the isolation diodes that are being connected in series to each stator coil.

11. The ESP according to claim 1, further comprising three push-pull drivers.

* * * * *